US011588959B2

(12) United States Patent
Amano (10) Patent No.: US 11,588,959 B2
(45) Date of Patent: Feb. 21, 2023

(54) IMAGING APPARATUS

(71) Applicant: Panasonic Intellectual Property Management Co., Ltd., Osaka (JP)

(72) Inventor: Takuya Amano, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/503,322

(22) Filed: Oct. 17, 2021

(65) Prior Publication Data

US 2022/0286585 A1 Sep. 8, 2022

(30) Foreign Application Priority Data

Mar. 5, 2021 (JP) .............................. JP2021-035600

(51) Int. Cl.
*H04N 5/225* (2006.01)
(52) U.S. Cl.
CPC ................................. *H04N 5/2252* (2013.01)
(58) Field of Classification Search
CPC ............ H04N 5/2252; H05K 7/20154; H05K 7/20172; H05K 7/20409; G03B 17/55
See application file for complete search history.

(56) References Cited

U.S. PATENT DOCUMENTS

| 9,485,451 | B2* | 11/2016 | Kawamura | .......... H04N 5/2253 |
| 10,114,221 | B1* | 10/2018 | Evans, V | ........... H04N 5/23245 |
| 2017/0261840 | A1* | 9/2017 | Yoneda | .................. G03B 17/55 |
| 2022/0124225 | A1* | 4/2022 | Gunji | .................... G03B 17/14 |
| 2022/0210299 | A1* | 6/2022 | Kwon | ................. H04N 5/2252 |

FOREIGN PATENT DOCUMENTS

| JP | 2013-098430 A | | 5/2013 |
| JP | 2013098430 A | * | 5/2013 |
| JP | 2020-113889 A | | 7/2020 |
| WO | 2016/031369 A1 | | 3/2016 |

\* cited by examiner

*Primary Examiner* — Amy R Hsu
(74) *Attorney, Agent, or Firm* — Renner, Otto, Boisselle & Sklar, LLP (57) ABSTRACT

An imaging apparatus includes: a duct; a fan that generates a flow of air in the duct; first, second, and third cooling targets; a first heat sink that absorbs heat of the first cooling target and includes first fins exposed in the duct; a second heat sink that absorbs heat of the second cooling target and includes second fins exposed in the duct; and a third heat sink that absorbs heat of the third cooling target and includes third fins exposed in the duct. The first, second and third fins extend in different directions from one another, as viewed in a direction of the flow of air in the duct, as far as each of the fins gets close to another fin with a predetermined distance apart.

19 Claims, 8 Drawing Sheets

|  |  | AMOUNT OF HEAT OF COOLING TARGET | | |
|---|---|---|---|---|
|  |  | COOLING TARGET X1 (LARGE AMOUNT OF HEAT) | COOLING TARGET X2 (MEDIUM AMOUNT OF HEAT) | COOLING TARGET X3 (SMALL AMOUNT OF HEAT) |
| ALLOWABLE TEMPERATURE OF COOLING TARGET | COOLING TARGET Y1 (HIGH ALLOWABLE TEMPERATURE) | FIN SURFACE AREA MEDIUM | FIN SURFACE AREA SMALL | FIN SURFACE AREA EXTRA SMALL |
|  | COOLING TARGET Y2 (MEDIUM ALLOWABLE TEMPERATURE) | FIN SURFACE AREA LARGE | FIN SURFACE AREA MEDIUM | FIN SURFACE AREA SMALL |
|  | COOLING TARGET Y3 (LOW ALLOWABLE TEMPERATURE) | FIN SURFACE AREA EXTRA LARGE | FIN SURFACE AREA LARGE | FIN SURFACE AREA MEDIUM |

Fig.11

|  |  | AMOUNT OF HEAT OF COOLING TARGET | | |
|---|---|---|---|---|
|  |  | IC CHIP (LARGE AMOUNT OF HEAT) | IMAGING ELEMENT (MEDIUM AMOUNT OF HEAT) | CONNECTOR (SMALL AMOUNT OF HEAT) |
| ALLOWABLE TEMPERATURE OF COOLING TARGET | IC CHIP (HIGH ALLOWABLE TEMPERATURE) | FIN SURFACE AREA MEDIUM | FIN SURFACE AREA SMALL | FIN SURFACE AREA EXTRA SMALL |
|  | CONNECTOR (MEDIUM ALLOWABLE TEMPERATURE) | FIN SURFACE AREA LARGE | FIN SURFACE AREA MEDIUM | FIN SURFACE AREA SMALL |
|  | IMAGING ELEMENT (LOW ALLOWABLE TEMPERATURE) | FIN SURFACE AREA EXTRA LARGE | FIN SURFACE AREA LARGE | FIN SURFACE AREA MEDIUM |

|  |  | AMOUNT OF HEAT OF COOLING TARGET | | |
|---|---|---|---|---|
|  |  | IC CHIP (LARGE AMOUNT OF HEAT) | CONNECTOR (MEDIUM AMOUNT OF HEAT) | IMAGING ELEMENT (SMALL AMOUNT OF HEAT) |
| ALLOWABLE TEMPERATURE OF COOLING TARGET | CONNECTOR (HIGH ALLOWABLE TEMPERATURE) | FIN SURFACE AREA MEDIUM | FIN SURFACE AREA SMALL | FIN SURFACE AREA EXTRA SMALL |
|  | IC CHIP (MEDIUM ALLOWABLE TEMPERATURE) | FIN SURFACE AREA LARGE | FIN SURFACE AREA MEDIUM | FIN SURFACE AREA SMALL |
|  | IMAGING ELEMENT (LOW ALLOWABLE TEMPERATURE) | FIN SURFACE AREA EXTRA LARGE | FIN SURFACE AREA LARGE | FIN SURFACE AREA MEDIUM |

|  |  | AMOUNT OF HEAT OF COOLING TARGET | | |
|---|---|---|---|---|
|  |  | CONNECTOR (LARGE AMOUNT OF HEAT) | IC CHIP (MEDIUM AMOUNT OF HEAT) | IMAGING ELEMENT (SMALL AMOUNT OF HEAT) |
| ALLOWABLE TEMPERATURE OF COOLING TARGET | IMAGING ELEMENT (HIGH ALLOWABLE TEMPERATURE) | FIN SURFACE AREA MEDIUM | FIN SURFACE AREA SMALL | FIN SURFACE AREA EXTRA SMALL |
|  | IC CHIP (MEDIUM ALLOWABLE TEMPERATURE) | FIN SURFACE AREA LARGE | FIN SURFACE AREA MEDIUM | FIN SURFACE AREA SMALL |
|  | CONNECTOR (LOW ALLOWABLE TEMPERATURE) | FIN SURFACE AREA EXTRA LARGE | FIN SURFACE AREA LARGE | FIN SURFACE AREA MEDIUM |

IMAGING APPARATUS

BACKGROUND OF THE INVENTION

Field of the Invention

The present disclosure relates to an imaging apparatus.

Description of the Related Art

For example, WO 2016/031369 A discloses an imaging apparatus having a cooling mechanism including a duct, a fan disposed in the duct, a heat sink that absorbs heat of a cooling target, and a plurality of fins that is disposed in the duct through which air flows and is thermally connected to the heat sink.

SUMMARY OF THE INVENTION

Meanwhile, in a case where: there are a plurality of cooling targets; fins are provided for each of the plurality of cooling targets; and these fins are disposed in one duct, some of the cooling targets may be unnecessarily cooled. For example, if one of the cooling targets at an allowable temperature is appropriately cooled, another cooling target that has not reached an allowable temperature may be unnecessarily cooled.

Therefore, an object of the present disclosure is to efficiently cool a plurality of cooling targets with different allowable temperatures in an imaging apparatus in which pluralities of fins are disposed in one duct and each plurality of fins are thermally connected to each of the plurality of cooling targets.

In order to achieve the above object, one aspect of the present disclosure provides an imaging apparatus including:
 a duct through which air flows;
 a fan that generates a flow of air in the duct;
 a first cooling target disposed outside the duct;
 a first heat sink that absorbs heat of the first cooling target and includes a plurality of first fins exposed in the duct;
 a second cooling target disposed outside the duct;
 a second heat sink that absorbs heat of the second cooling target and includes a plurality of second fins exposed in the duct;
 a third cooling target disposed outside the duct; and
 a third heat sink that absorbs heat of the third cooling target and includes a plurality of third fins exposed in the duct, in which
 the first fins, the second fins, and the third fins extend in different directions from one another, as viewed in a direction of the flow of air in the duct, as far as each of the fins gets close to another fin with a predetermined distance apart.

According to the present disclosure, in an imaging apparatus in which pluralities of fins are disposed in one duct and each plurality of fins is thermally connected to each of a plurality of cooling targets, the plurality of cooling targets with different allowable temperatures can be efficiently cooled.

DESCRIPTION OF THE PREFERRED EMBODIMENTS

Hereinafter, the preferred embodiments will be described in detail with appropriate reference to the drawings. However, description that is more detailed than necessary may be omitted. For example, detailed descriptions of already well-known matters or repeated description of substantially the same configurations may be omitted. This is to avoid unnecessary redundancy in the following description and to facilitate understanding by those skilled in the art.

The inventor(s) provides (provide) the accompanying drawings and the following description in order for those skilled in the art to fully understand the present disclosure, and the drawings and description are not intend to limit the claimed subject matters.

Hereinafter, imaging apparatuses according to preferred embodiments of the present disclosure will be described with reference to the drawings.

Figure 1:
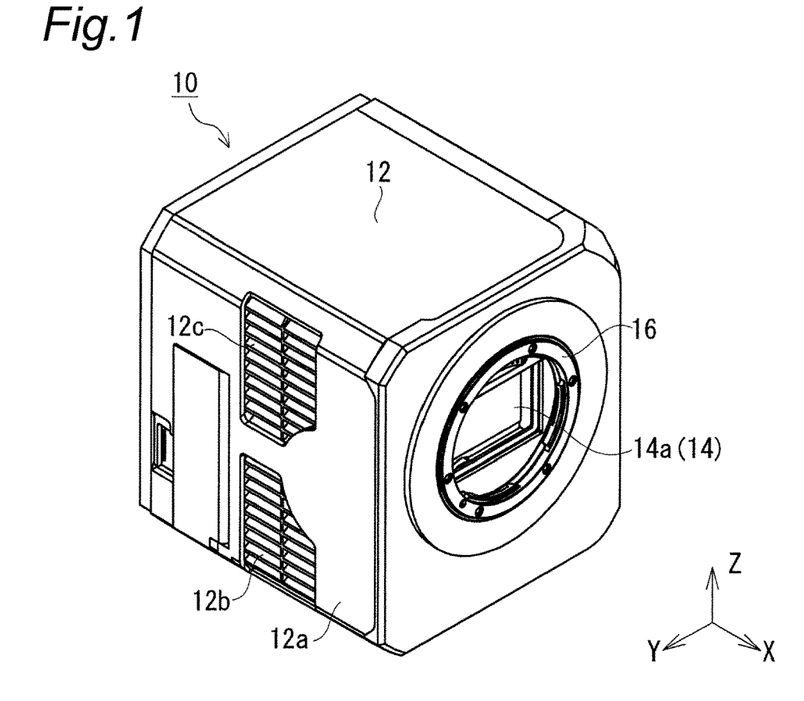
FIG. 1 is a perspective view of an imaging apparatus according to a preferred embodiment of the present disclosure.
Figure 2:
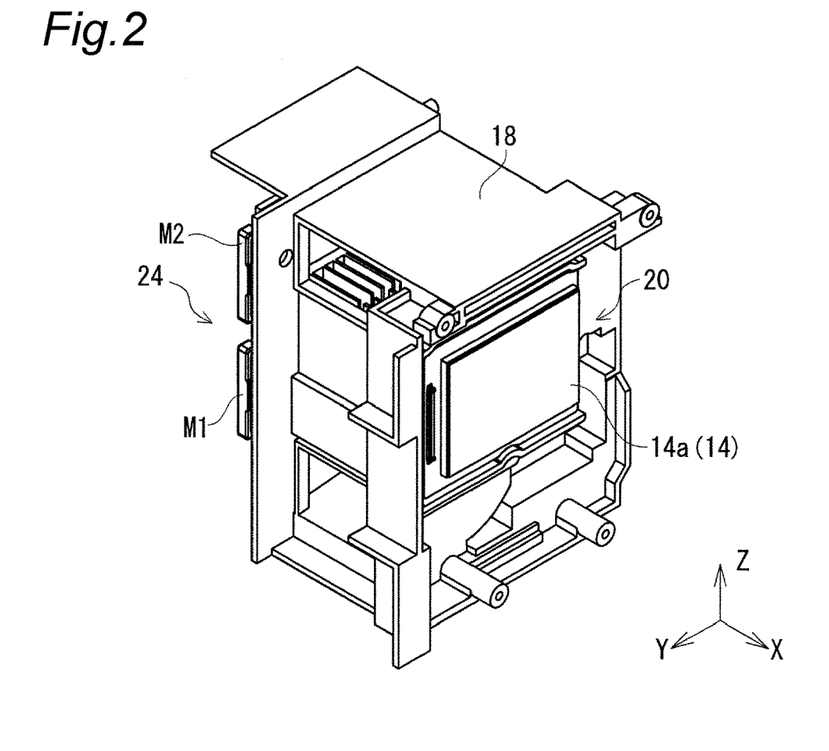
FIG. 2 is a perspective view of a subassembly of the imaging apparatus including components relating to cooling.
Figure 3:
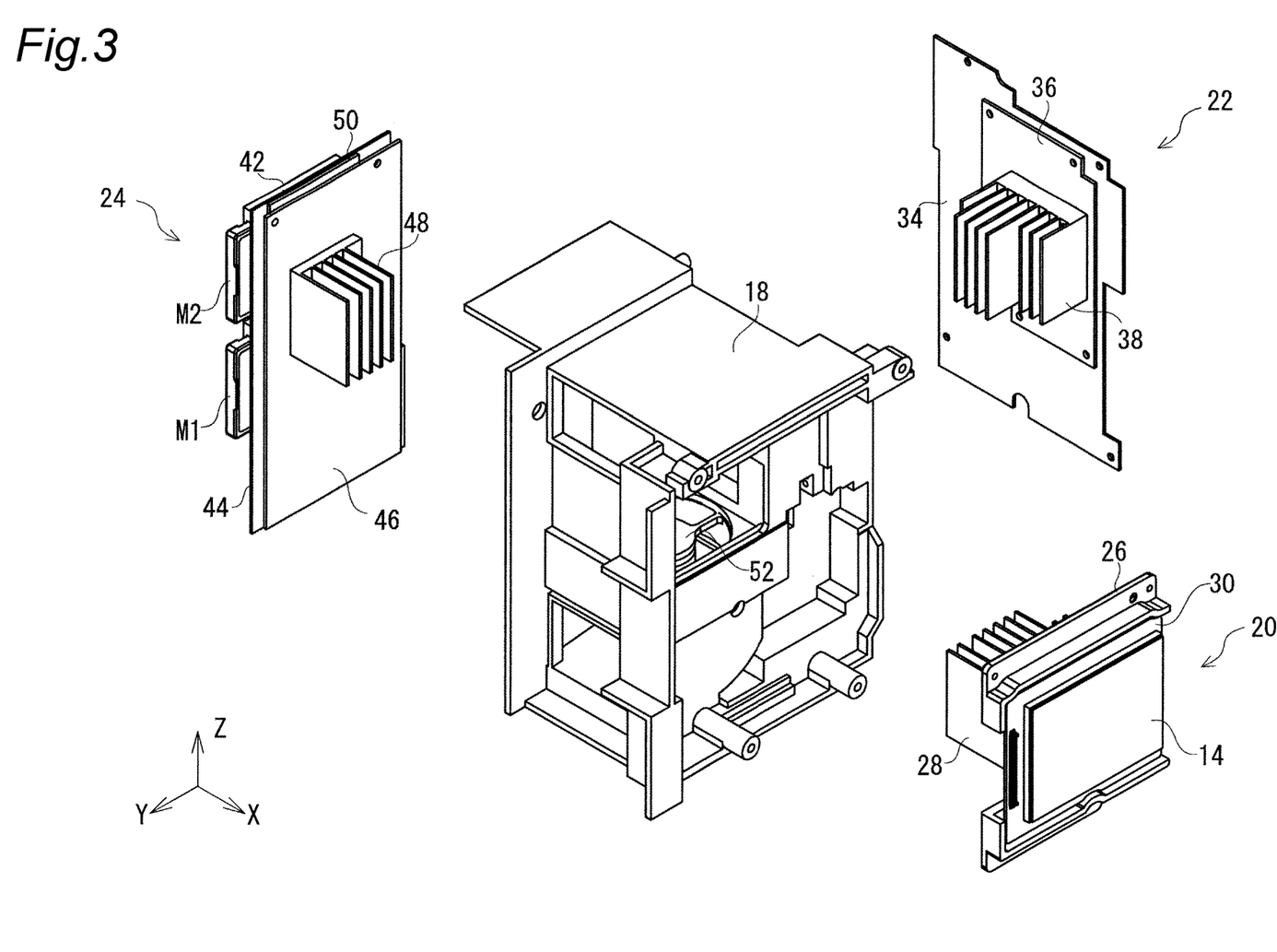
FIG. 3 is an exploded perspective view of the subassembly illustrated in FIG. 2.

FIG. 1 is a perspective view of an imaging apparatus according to a preferred embodiment of the present disclosure. In addition, FIG. 2 is a perspective view of a subassembly of the imaging apparatus including components relating to cooling. Furthermore, FIG. 3 is an exploded perspective view of the subassembly illustrated in FIG. 2.

Note that the X-Y-Z Cartesian coordinate system illustrated in the views is for facilitating understanding of the present disclosure and does not limit the present disclosure. An X-axis direction indicates the front-rear direction of the imaging apparatus, a Y-axis direction indicates the left-right direction of the imaging apparatus, and a Z-axis direction indicates the height direction. In addition, in the present specification, a side on which a subject of the imaging apparatus is present is defined as a "front side", and a side on which the imaging apparatus is present with respect to the subject is defined as a "rear side."

In the case of the present preferred embodiment, an imaging apparatus 10 includes a casing 12 having a substantially cubic shape, and an imaging element (first cooling target) 14 disposed inside the casing 12, as illustrated in FIG.

1. The imaging element 14 is, for example, a CCD image sensor, a CMOS image sensor, or the like, and generates heat during operation. Thus, the imaging element 14 needs to be cooled in order to keep its temperature within an allowable temperature range. Light (image of subject) that has passed through a lens (not illustrated) attached to a lens attachment part 16 is incident on a light receiving surface 14a of the imaging element 14. The imaging element 14 outputs an electric signal corresponding to the incident image, that is, takes an image (takes a still image or a moving image).

As illustrated in FIGS. 2 and 3, the imaging apparatus 10 also includes a main frame 18 disposed in the casing 12. The main frame 18 supports an imaging unit 20, an image processing unit 22, and a write unit 24.

Figure 4:
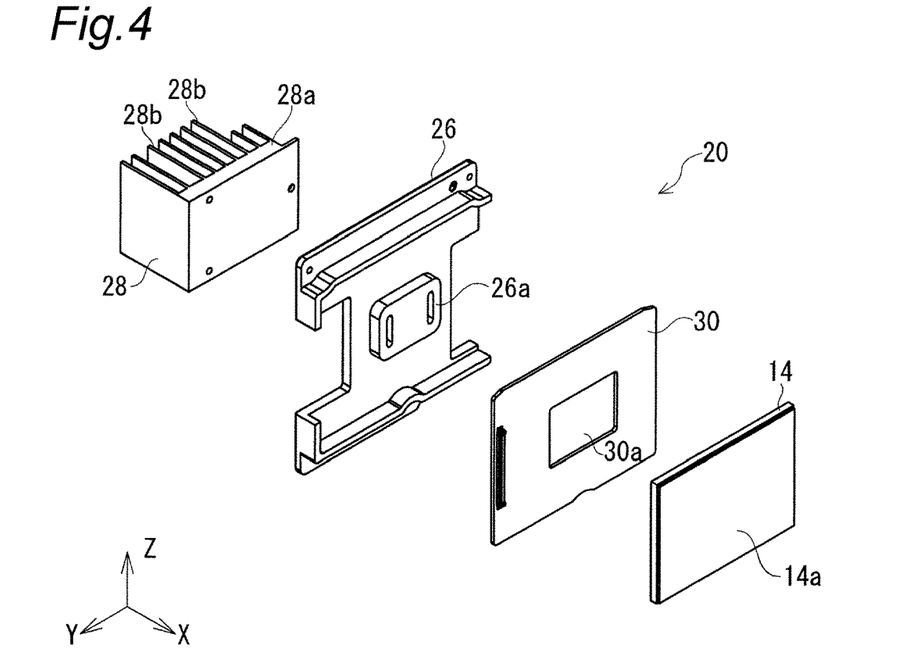
FIG. 4 is an exploded perspective view of an imaging unit.

FIG. 4 is an exploded perspective view of the imaging unit.

As illustrated in FIG. 4, the imaging unit 20 includes the imaging element 14, a heat dissipation plate 26 that supports the imaging element 14 and absorbs heat, and a heat sink (first heat sink) 28 attached to the heat dissipation plate 26. The imaging element 14 is mounted on a substrate 30, and the substrate 30 is supported by the heat dissipation plate 26. The substrate 30 is provided with a circuit or the like that processes a signal from the imaging element 14 and transmits the processed signal to the image processing unit 22. In addition, a through hole 30a is formed in the substrate 30. The through hole 30a allows a convex part 26a provided on the heat dissipation plate 26 to directly contact the imaging element 14. As a result, the heat dissipation plate 26 can efficiently absorb heat of the imaging element 14 to cool the imaging element 14.

The heat sink 28 is made of a metal material such as aluminum having a high thermal conductivity, and includes a base part 28a attached to the heat dissipation plate 26 and a plurality of fins (first fins) 28b extending in parallel to each other from the base part 28a. In the case of the present preferred embodiment, the heat sink 28 absorbs the heat of the imaging element 14 via the heat dissipation plate 26. Although details will be described later, the plurality of fins 28b of the heat sink 28 are cooled by the air flowing in the duct of the main frame 18.

Figure 5:
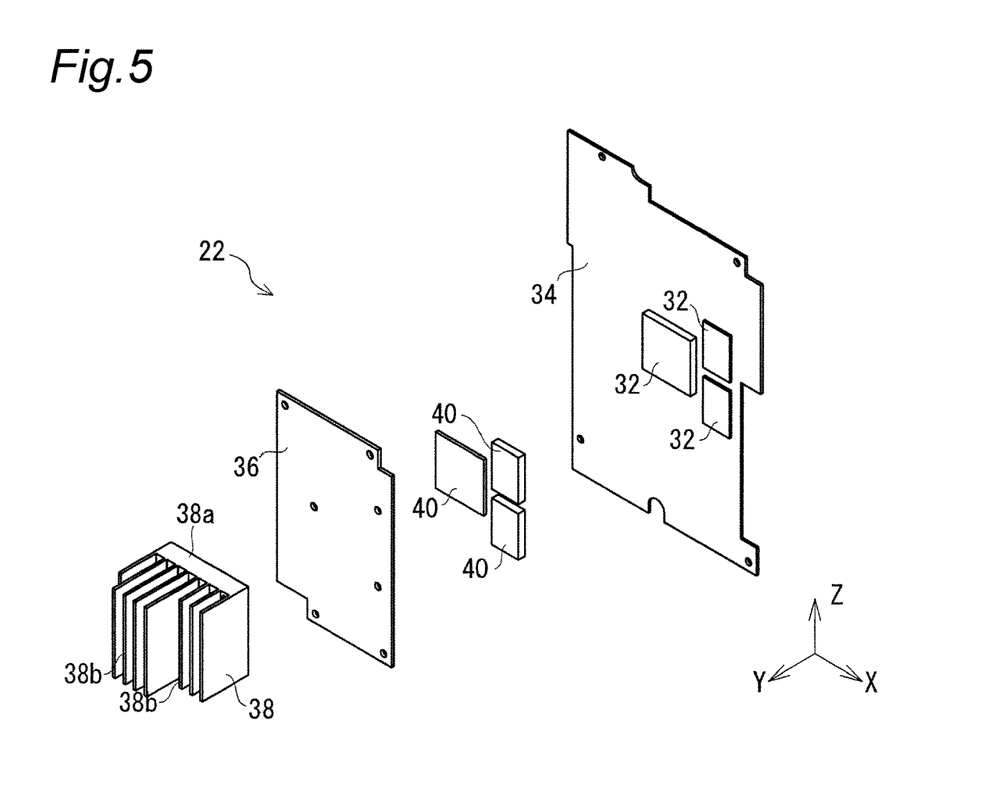
FIG. 5 is an exploded perspective view of an image processing unit.

FIG. 5 is an exploded perspective view of the image processing unit.

As illustrated in FIG. 5, the image processing unit 22 includes a plurality of IC chips (second cooling target) 32 that process an image data generated by the imaging element 14, a substrate 34 on which the IC chips 32 are mounted, a heat dissipation plate 36 that absorbs heat of the IC chips 32, and a heat sink (second heat sink) 38 attached to the heat dissipation plate 36. Since the IC chips 32 generate heat during operation, they need to be cooled to keep their temperatures within an allowable temperature range. The heat dissipation plate 36 is in contact with the plurality of the IC chips 32 via heat transfer sheets 40. As a result, the heat dissipation plate 36 can absorb the heat of the plurality of the IC chips 32 to cool them.

The heat sink 38 is made of a metal material such as aluminum having a high thermal conductivity, and includes a base part 38a attached to the heat dissipation plate 36 and a plurality of fins (second fins) 38b extending in parallel to each other from the base part 38a. In the case of the present preferred embodiment, the heat sink 38 absorbs the heat of the plurality of the IC chips 32 via the heat dissipation plate 36. Although details will be described later, the plurality of fins 38b of the heat sink 38 are cooled by the air flowing in the duct of the main frame 18.

Figure 6:
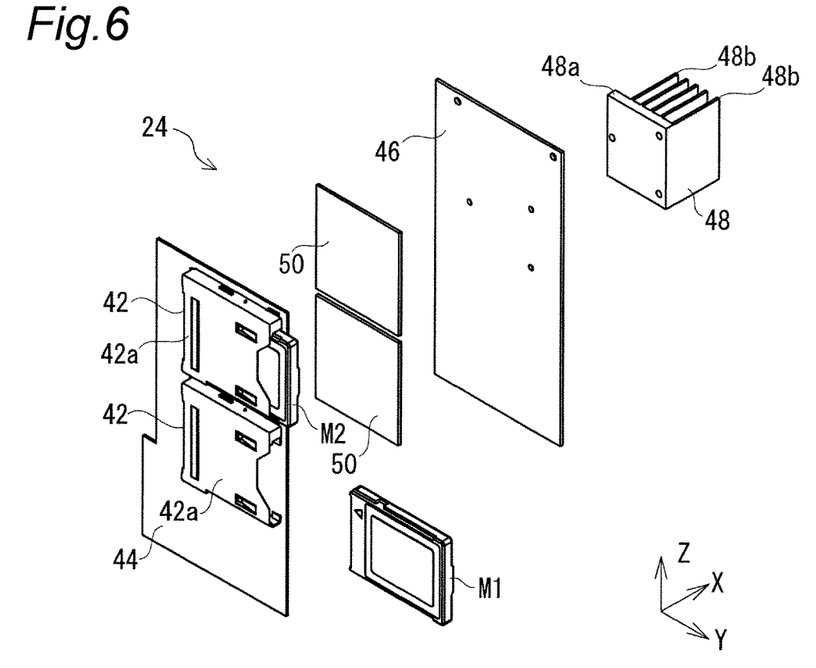
FIG. 6 is an exploded perspective view of a write unit.

FIG. 6 is an exploded perspective view of the write unit.

As illustrated in FIG. 6, the write unit 24 includes a plurality of connectors (third cooling target) 42 into which recording media M1, M2 that the image data processed by the IC chips 32 are recorded are inserted, a substrate 44 on which the connectors 42 are mounted, a heat dissipation plate 46 that absorbs heat of the connectors 42, and a heat sink (third heat sink) 48 attached to the heat dissipation plate 46. Each of the connectors 42 roughly includes a portion of the substrate 44 provided with a terminal (not illustrated) electrically connected to a terminal of the recording medium M1, M2, and a connector frame 42a that covers the portion of the substrate 44 to keep contact between the terminal on the substrate 44 and the terminal of the recording medium M1, M2. The connector 42 itself does not generate heat, but the recording media M1, M2 inserted into the connectors 42 generate heat during writing. The recording media M1, M2 are cooled via the connectors 42 in order to be kept at an appropriate temperature. That is, since the recording media M1, M2 being written cannot be directly cooled, the recording media M1, M2 are indirectly cooled by directly cooling the connectors 42. Note that the recording media M1, M2 are, for example, CFexpress cards.

The heat dissipation plate 46 absorbs heat from a portion of the substrate 44 included in the connector 42 via a heat transfer sheet 50. As a result, the heat dissipation plate 46 can cool the recording media M1, M2 inserted into the connectors 42. Note that the heat dissipation plate 46 can also cool the recording media M1, M2 by absorbing heat from the connector frames 42a of the connectors 42.

The heat sink 48 is made of a metal material such as aluminum having a high thermal conductivity, and includes a base part 48a attached to the heat dissipation plate 46 and a plurality of fins (third fins) 48b extending in parallel to each other from the base part 48a. In the case of the present preferred embodiment, the heat sink 48 absorbs the heat of the portions of the substrate 44 included in the plurality of the connectors 42 via the heat dissipation plate 46. Although details will be described later, the plurality of fins 48b of the heat sink 48 are cooled by the air flowing in the duct of the main frame 18.

As described above, the plurality of fins 28b of the heat sink 28 of the imaging unit 20, the plurality of fins 38b of the heat sink 38 of the image processing unit 22, and the plurality of fins 48b of the heat sink 48 of the write unit 24 are cooled by the air flowing in the duct of the main frame 18.

Figure 7:
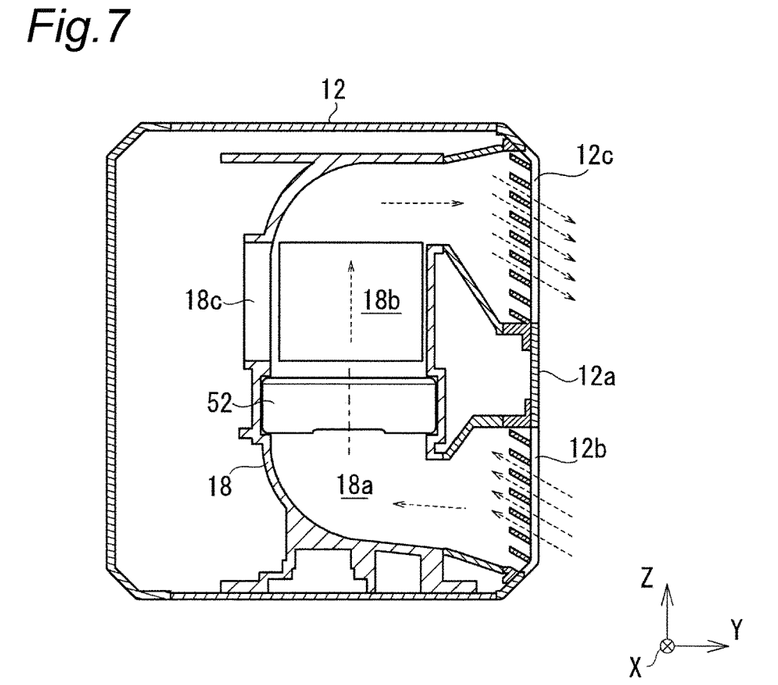
FIG. 7 is a cross-sectional view of the imaging apparatus illustrating the duct.
Figure 8:
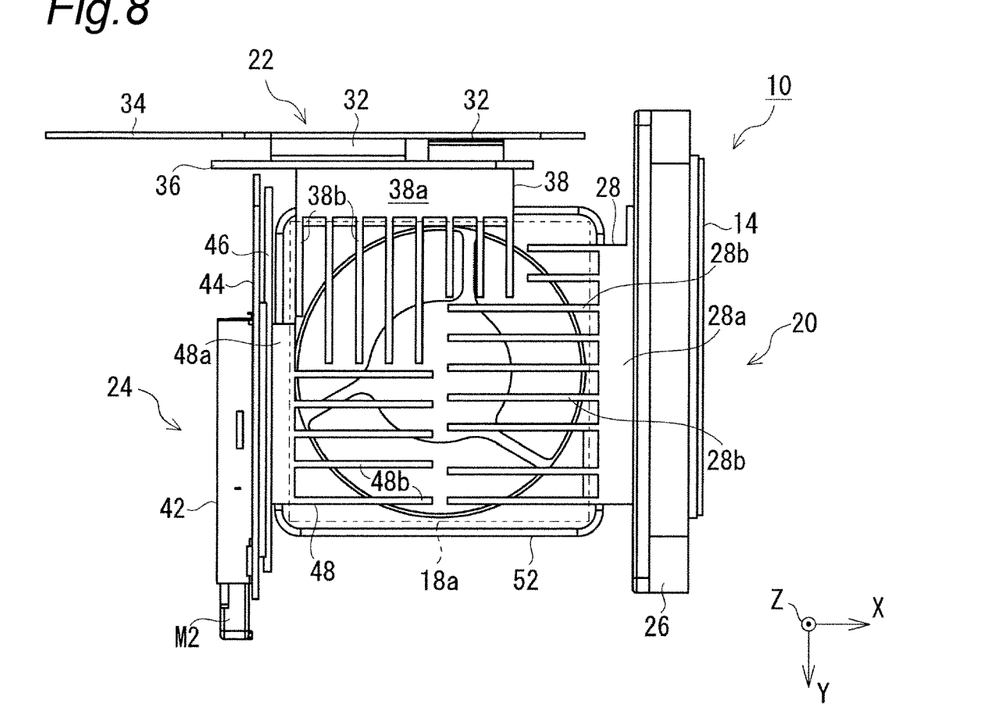
FIG. 8 is a view illustrating a fin layout in the duct.
Figure 9:
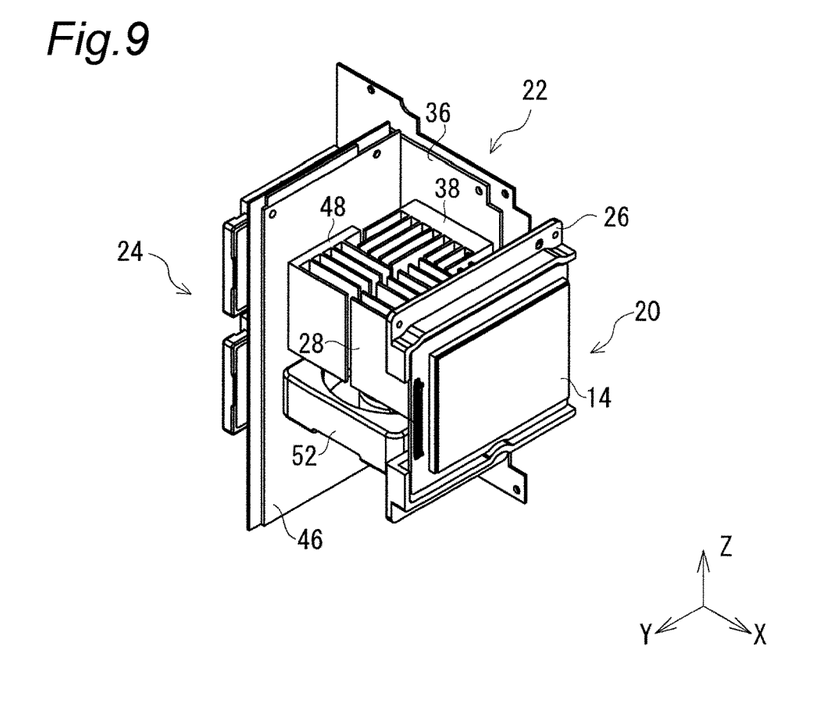
FIG. 9 is a perspective view of the subassembly illustrated in FIG. 2 in which a main frame is omitted.

FIG. 7 is a cross-sectional view of the imaging apparatus illustrating the duct. In addition, FIG. 8 is a view illustrating a fin layout in the duct. And, FIG. 9 is a perspective view of the subassembly illustrated in FIG. 2 in which the main frame is omitted.

As illustrated in FIG. 7, the main frame 18 of the imaging apparatus 10 includes a duct 18a through which air (dashed arrows) flows. As illustrated in FIG. 1, the air flows into the duct 18a through an intake port 12b formed in a right side surface 12a of the casing 12. The outside air flowing into the duct 18a flows out of the casing 12 through an exhaust port 12c.

As illustrated in FIG. 7, a fan 52 is disposed in the duct 18a of the main frame 18. When the fan 52 rotates, air flows into the duct 18a through the intake port 12b, and the air in the duct 18a flows out of the casing 12 through the exhaust port 12c.

As illustrated in FIG. 8, the imaging element 14 of the imaging unit 20, the IC chips 32 of the image processing unit 22, and the connectors 42 of the write unit 24 are located outside the duct 18a. The plurality of fins 28b of the heat sink 28 of the imaging unit 20, the plurality of fins 38b of the heat sink 38 of the image processing unit 22, and the plurality of fins 48b of the heat sink 48 of the write unit 24, which absorb these heat, are exposed in the duct 18a. Therefore, in the duct 18a, a through hole 18b through which the heat sink 28 passes, a through hole 18c through which the heat sink 38 passes, and a through hole (not illustrated) through which the heat sink 48 passes are formed to communicate with each other, as illustrated in FIG. 7.

In the case of the present preferred embodiment, the duct 18a has a rectangular channel cross section, as illustrated in FIG. 8. In addition, the imaging unit 20 (imaging element 14) and the write unit 24 (connectors 42) are supported by the main frame 18 so as to face each other across the duct 18a.

As illustrated in FIG. 8, the plurality of fins 28b of the heat sink 28, the plurality of fins 38b of the heat sink 38, and the plurality of fins 48b of the heat sink 48 extend, as viewed in a direction (Z-axis direction) of the flow of air in the duct 18a, in different directions from one another. In the case of the present preferred embodiment, the plurality of fins 28b and the plurality of fins 48b extend in the front-rear direction (X-axis direction) of the imaging apparatus 10, and the plurality of fins 38b extend in the left-right direction (Y-axis direction) of the imaging apparatus 10.

In addition, the plurality of fins 28b of the heat sink 28, the plurality of fins 38b of the heat sink 38, and the plurality of fins 48b of the heat sink 48 extend as far as each of the fins gets close to another fin with a predetermined distance apart. The predetermined distance is a distance at which heat transfer does not occur between different fins (i.e., between the fins 28b and the fins 38b, between the fins 38b and the fins 48b, and between the fins 48b and the fins 28b). For example, the predetermined distance is larger than a value at which interference (contact) does not occur due to a variation in manufacturing, and is smaller than a pitch of the fins 28b, a pitch of the fins 38b, and a pitch of the fins 48b. The predetermined distance is, for example, 0.5 to 3.1 mm.

Furthermore, in the case of the present preferred embodiment, the plurality of fins 28b of the heat sink 28, the plurality of fins 38b of the heat sink 38, and the plurality of fins 48b of the heat sink 48 are identical in position in the direction (Z-axis direction) of the flow of air in the duct 18a, as illustrated in FIG. 9. Still furthermore, they are identical in size in the direction of the flow.

According to such fins 28b, 38b, and 48b, the fins 28b, 38b, and 48b are densely disposed in the entire duct 18a without contacting each other, as shown in FIG. 8. As a result, the distribution of the channel resistance of the entire duct 18 is made uniform. In addition, the fins 28b, 38b, and 48b are disposed in parallel with respect to the direction (Z-axis direction) of the flow of air in the duct 18a. As a result, air at substantially the same temperature comes into contact with the fins 28b, 38b, and 48b. In contrast, if the fins 28b, 38b, and 48b are disposed in series in the direction of the flow, the air warmed by the fins of the upstream comes into contact with the fins of the downstream. As a result, the cooling efficiency of the heat sink including the fins of the downstream decreases.

Such fins 28b, 38b, and 48b are cooled by air under substantially the same conditions, and are not thermally connected to each other. That is, the respective fins 28b, 38b, and 48b are substantially thermally independent of each other without being substantially thermally affected by each other. Therefore, it is only necessary to set the extension lengths and the numbers of fins of the respective fins 28b, 38b, and 48b based on the amounts of heat of the imaging element 14 of the imaging unit 20, the IC chips 32 of the image processing unit 22, and the connectors 42 of the write unit 24.

The amounts of heat of the imaging element 14 and the IC chips 32 are determined by imaging conditions such as image resolution, moving image resolution, and frame rate, and can be obtained in advance by experiments or the like. The amount of heat of the connectors 42 is determined by recording conditions such as a type of data to be recorded (e.g., a file type of an image data or a moving image data) and a recording format (e.g., relay recording, backup recording), and can be obtained in advance by experiments or the like. Note that the relay recording is a recording format in which data is first recorded on the recording medium M1 and recording on the recording medium M2 is started when the recording medium M1 runs out of capacity. In addition, the backup recording is a recording format in which the same data are recorded in a plurality of the recording media M1, M2.

Before the extension lengths and the numbers of fins of the plurality of fins 28b of the heat sink 28, the plurality of fins 38b of the heat sink 38, and the plurality of fins 48b of the heat sink 48 are set, respective surface areas of them are first determined.

Figure 10:
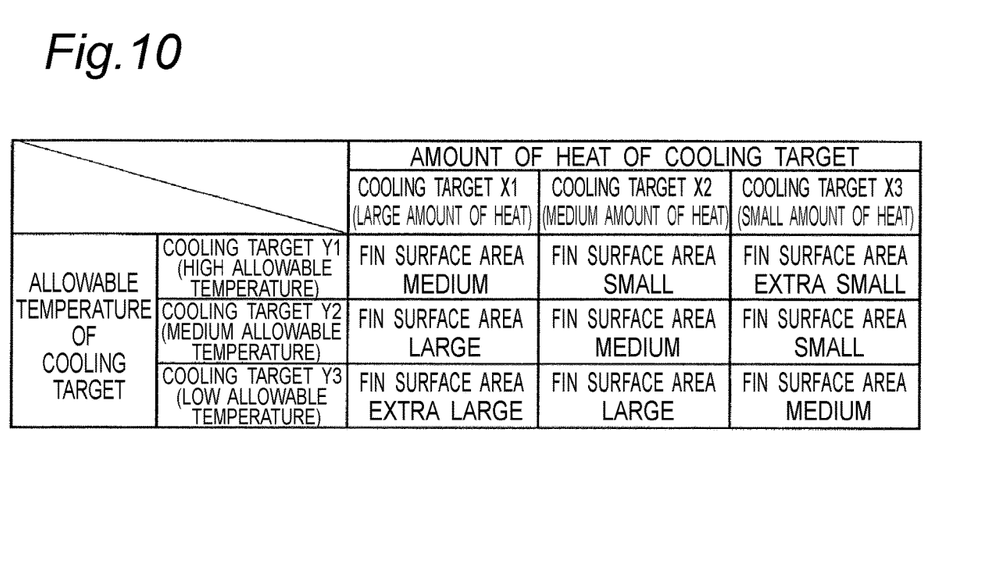
FIG. 10 is a view illustrating a fin surface area determination table for determining fin surface areas.

FIG. 10 illustrates a fin surface area determination table for determining fin surface areas.

As illustrated in FIG. 10, each of the fin surface areas are determined based on the amount of heat and the allowable temperature of each of a plurality of cooling targets. First, data on the amounts of heat and the allowable temperatures of the plurality of cooling targets are acquired, and the magnitudes thereof are compared among the cooling targets. In the case of the present preferred embodiment, the imaging element 14, the IC chips 32, and the connectors 42 are present as the plurality of cooling targets. The amounts of heat that can be held by the respective imaging element 14, IC chips 32, and connectors 42, and the allowable temperatures (allowable temperature ranges) at which they operate normally are acquired. Then, the magnitudes of the acquired amounts of heat and allowable temperatures are compared among the cooling targets.

In the case of the present preferred embodiment, the IC chips 32 have the largest amount of heat, and the connectors 42 have the smallest amount of heat. Regarding the allowable temperatures, the IC chips 32 have the largest one, and the imaging element 14 has the smallest one. That is, the cooling target X1, Y1 in FIG. 10 corresponds to the IC chips 32, the cooling target X2, Y3 corresponds to the imaging element 14, and the cooling target X3, Y2 corresponds to the connectors 42.

Figure 11:
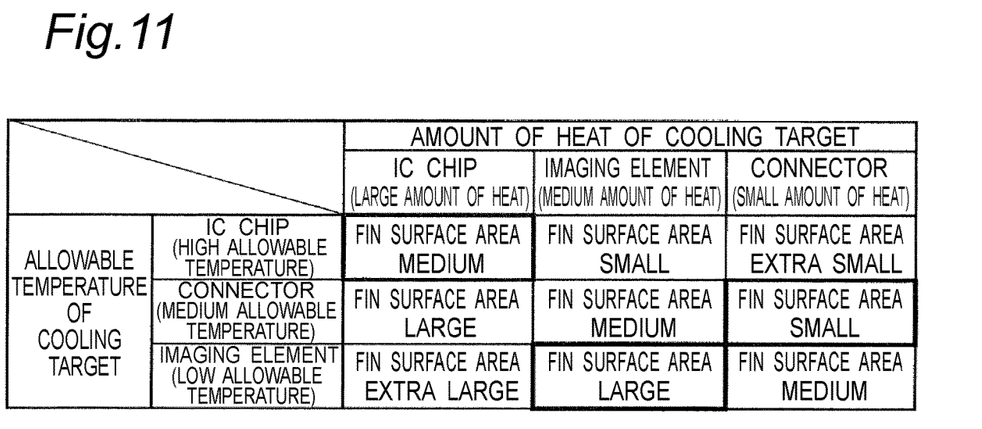
FIG. 11 is a view illustrating a fin surface area determination table corresponding to FIG. 8.

FIG. 11 illustrates a fin surface area determination table corresponding to FIG. 8.

When the imaging element 14, the IC chips 32, and the connectors 42 are substituted into X1 to X3, Y1 to Y3 illustrated in FIG. 10, the fin surface area determination table illustrated in FIG. 11 is obtained. According to this table, the surface area of the fins 28b of the heat sink 28 corresponding to the imaging element 14 is determined to have the largest surface area, and the surface area of the fins 48b of the heat sink 48 corresponding to the connectors 42 is determined to have the smallest surface area. From the magnitude relationship of the determined fin surface areas, the extension lengths and the numbers of fins of the respective fins 28b, and fins 48b are determined. Note that the magnitude of the fin surface area represents, in other words, a degree of priority of cooling.

As a result of comparing the magnitudes of the fin surface areas, an average extension length (size in the X-axis direction) of the plurality of fins 28b of the heat sink 28 that absorbs the heat of the imaging element 14 is larger than an average extension length (size in the Y-axis direction) of the plurality of fins 38b of another heat sink 38, as illustrated in FIG. 8. In addition, the number of fins of the plurality of fins 28b of the heat sink 28 is larger than the numbers of fins of the pluralities of fins 38b, 48b of the other heat sinks 38, 48.

As described above, the fins 28b of the heat sink 28 that absorb the heat of the imaging element 14 having the highest degree of priority of cooling have the largest surface area, so that the average extension length thereof is larger than the average extension lengths of the fins of the other heat sinks, and the number of fins thereof is larger than the numbers of fins of the fins of the other heat sinks. As a result, the heat sink 28 can reliably cool the imaging element 14 having the highest degree of priority of cooling.

Note that the fins 48b of the heat sink 48 that absorb the heat of the connectors 42 having the lowest degree of priority of cooling have the smallest surface area, so that the number of fins thereof is smaller than the numbers of fins of the other pluralities of fins 28b, 38b. However, the extension length and the number of fins of the plurality of fins 48b are set to an extension length and a number of fins necessary for cooling the connectors 42. That is, the plurality of fins 48b have a minimum required surface area.

In addition, the average extension lengths and the numbers of fins of the pluralities of fins 28b, 38b, and 48b of the heat sinks 28, 38, and 48, respectively, are determined under the condition of the rotation speed of the fan 52 that rotates with allowable wind noise.

According to the present preferred embodiment as described above, in the imaging apparatus 10 which includes therein the pluralities of fins 28b, 38b, and 48b are thermally connected to the imaging element 14, the IC chips 32, and the connectors 42, respectively, that are a plurality of cooling targets disposed in one duct 18a, the imaging element 14, the IC chips 32, and the connectors 42 with different allowable temperatures can be efficiently cooled.

That is, the fins 28b, 38b, and 48b are thermally independent from one another, so that it is only necessary to consider the average extension lengths and the numbers of fins, in other words, total surface areas of each of the fins 28b, 38b, and 48b.

Note that if the average extension length and the number of fins of the plurality of fins of one heat sink are set to necessary values, there is a possibility that the average extension length and the number of fins of the plurality of fins of another heat sink cannot be set to necessary values. In this case, by increasing the rotation speed of the fan 52, the average extension length and the number of fins of the plurality of fins of one heat sink can be set to lower values. As a result, the average extension length and the number of fins of the plurality of fins of another heat sink can be set to necessary values.

Although the preferred embodiments of the present disclosure have been described above with reference to the above-described preferred embodiment, the preferred embodiments of the present disclosure are not limited to the above-described preferred embodiment.

In the case of the above-described preferred embodiment, for example, the imaging element 14 has the highest degree of priority of cooling and the connectors 42 have the lowest degree of priority of cooling, among the imaging element 14, the IC chips 32, and the connectors 42. However, the preferred embodiments of the present disclosure are not limited thereto.

Figure 12:
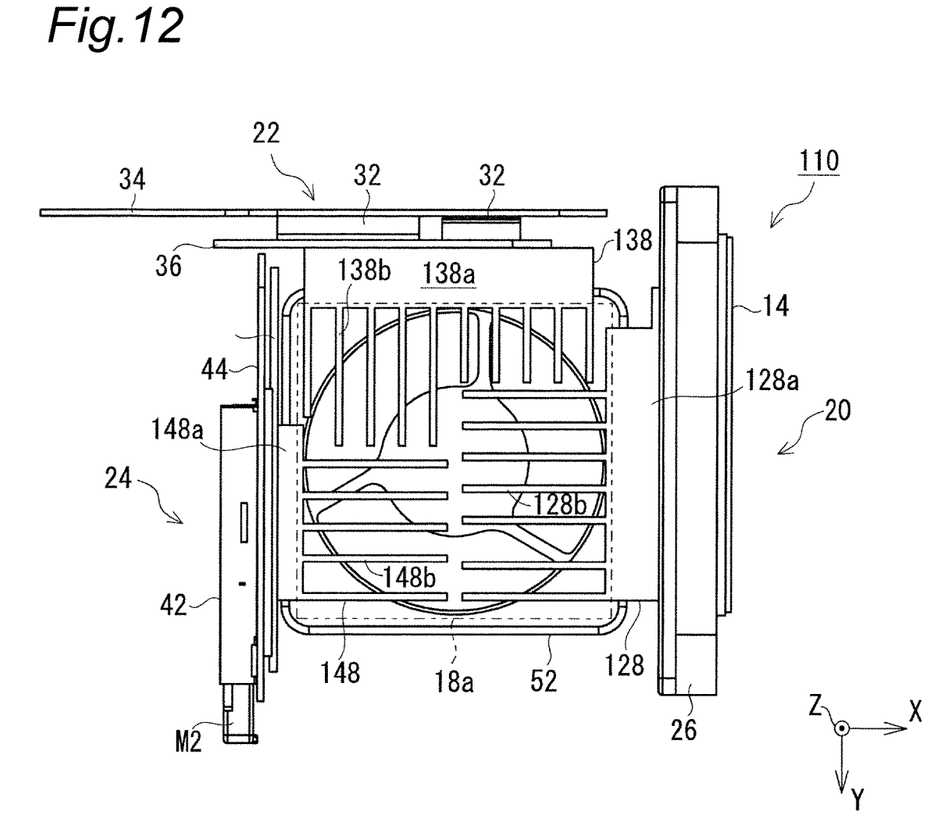
FIG. 12 is a view illustrating a fin layout in a duct in an imaging apparatus according to another preferred embodiment.
Figure 13:
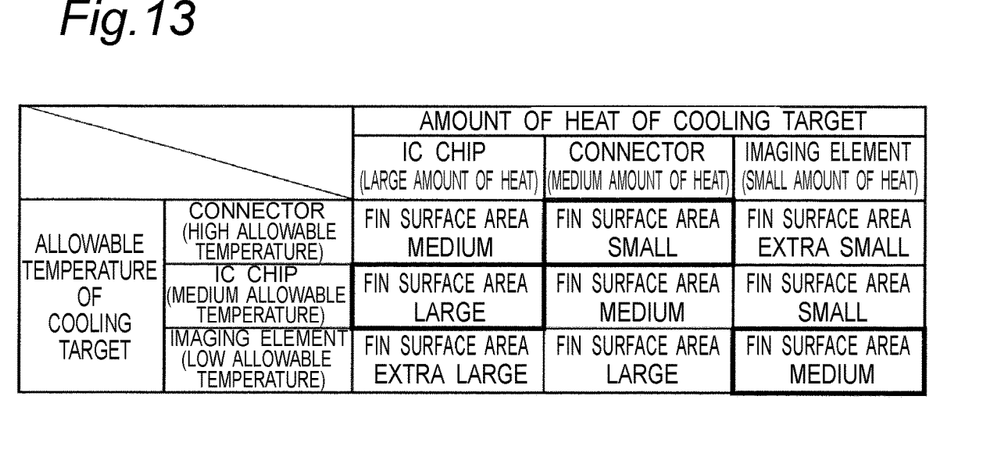
FIG. 13 is a view illustrating a fin surface area determination table corresponding to FIG. 12.
Figure 14:
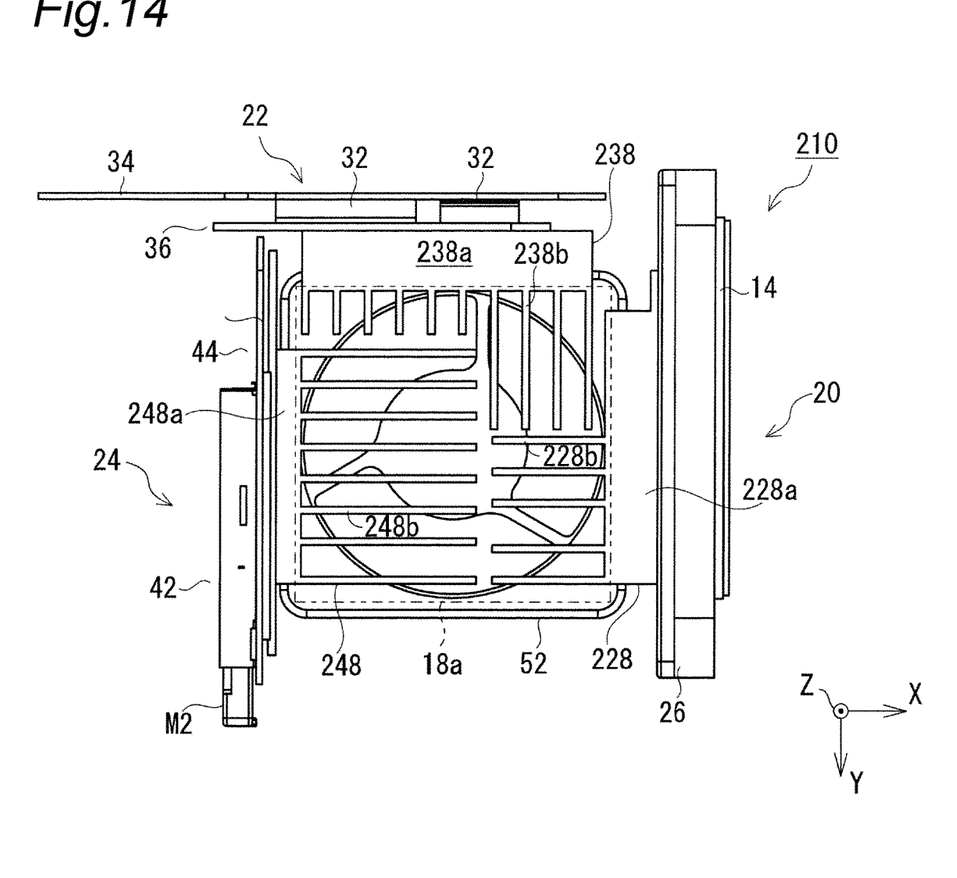
FIG. 14 is a view illustrating a fin layout in a duct in an imaging apparatus according to a different preferred embodiment.

FIG. 12 is a view illustrating a fin layout in a duct in an imaging apparatus according to another preferred embodiment. In addition, FIG. 13 is a view illustrating a fin surface area determination table corresponding to FIG. 12. Furthermore, FIG. 14 is a view illustrating a fin layout in a duct in an imaging apparatus according to a different preferred embodiment. And, FIG. 15 is a view illustrating a fin surface area determination table corresponding to FIG. 14.

In an imaging apparatus 110 according to another preferred embodiment illustrated in FIG. 12, IC chips 32 have the highest degree of priority of cooling and connectors 42 have the lowest degree of priority of cooling, among an imaging element 14, the IC chips 32, and the connectors 42, as illustrated in FIG. 13. Therefore, a heat sink 138 corresponding to the IC chips 32 has the largest fin surface area, and a heat sink 148 corresponding to the connectors 42 has the smallest fin surface area. As a result, the number of fins of a plurality of fins 138b of the heat sink 138 is larger than the numbers of fins of pluralities of fins 128b, 148b of the other heat sinks 128, 148.

Figure 15:
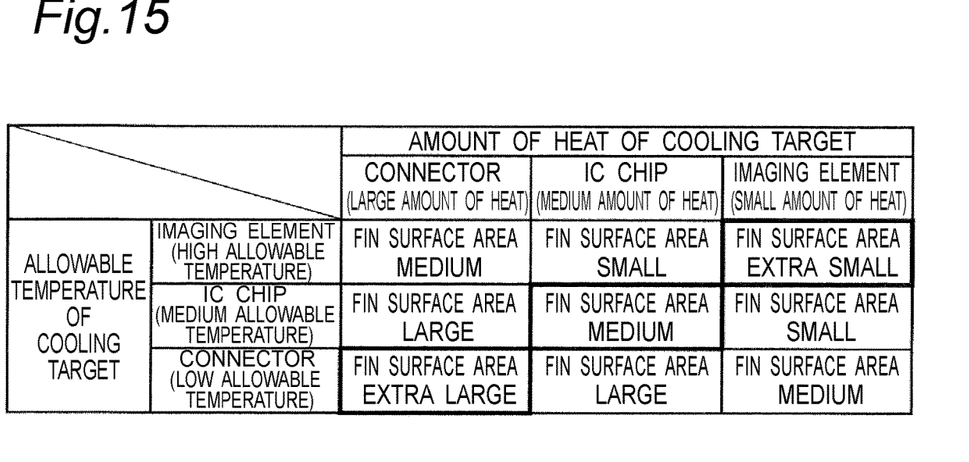
FIG. 15 is a view illustrating a fin surface area determination table corresponding to FIG. 14.

In an imaging apparatus 210 according to a different preferred embodiment illustrated in FIG. 14, connectors 42 have the highest degree of priority of cooling and an imaging element 14 has the lowest degree of priority of cooling, among the imaging element 14, IC chips 32, and the connectors 42, as illustrated in FIG. 15. Therefore, a heat sink 248 corresponding to the connectors 42 has the largest fin surface area, and a heat sink 228 corresponding to the imaging element 14 has the smallest fin surface area. As a result, an average extension length (size in the X-axis direction) of a plurality of fins 248b of the heat sink 248 is larger than average extension lengths of pluralities of fins 128b, 138b of the other heat sinks 128, 138. In addition, the plurality of fins 248b of the heat sink 248 extend beyond half of a duct 18a.

In addition, in the case of the above-described preferred embodiment, the plurality of fins 28b, the plurality of fins 38b, and the plurality of fins 48b are configured to be identical in size in the direction (Z-axis direction) of the flow of air, and identical in position in the direction of the flow of air, as illustrated in FIG. 9. However, the preferred embodiments of the present disclosure are not limited thereto. The sizes in the direction of the flow of air may be different. However, in this case, it is necessary to consider a fin layout in consideration of the size in the direction of the flow of air in addition to the average extension length and the number of fins of the fins. In addition, when the positions in the direction of the flow of air are different, fins of one heat sink may be slightly affected by fins of another heat sink. That is, some of the air warmed by the fins on the upstream side may come in contact with the fins on the downstream side.

Furthermore, in the case of the above-described preferred embodiment, the duct 18a has a rectangular channel cross section, as illustrated in FIG. 8. However, the preferred embodiments of the present disclosure are not limited thereto. The channel cross section of the duct 18a may have a shape other than a rectangular shape, for example, a triangular shape.

Still furthermore, in the case of the above-described preferred embodiment, the imaging element 14, the IC chips 32, and the connectors 42 are present as a plurality of cooling targets, and the heat sinks 28, 38, and 48 are respectively provided in them, as illustrated in FIG. 8.

However, the preferred embodiments of the present disclosure are not limited thereto. For example, a battery may be present as a fourth cooling target or as a substitute cooling target, and a heat sink may be provided for the battery.

That is, an imaging apparatus according to a preferred embodiment of the present disclosure includes, in a broad sense: a duct through which air flows; a fan that generates a flow of air in the duct; a first cooling target disposed outside the duct; a first heat sink that absorbs heat of the first cooling target and includes a plurality of first fins exposed in the duct; a second cooling target disposed outside the duct; a second heat sink that absorbs heat of the second cooling target and includes a plurality of second fins exposed in the duct; a third cooling target disposed outside the duct; and a third heat sink that absorbs heat of the third cooling target and includes a plurality of third fins exposed in the duct, in which the first fins, the second fins, and the third fins extend in different directions from one another, as viewed in a direction of the flow of air in the duct, as far as each of the fins gets close to another fin with a predetermined distance apart.

As described above, the preferred embodiments have been described as examples of the technology in the present disclosure. For this purpose, the accompanying drawings and detailed description are provided. Therefore, the components described in the accompanying drawings and detailed description can include not only components essential for solving the problems, but also components not essential for solving the problems provided as examples for describing the technology. Therefore, those non-essential components should not be immediately recognized as being essential on the grounds that they are described in the accompanying drawings and/or detailed description.

In addition, the above preferred embodiments are provided as examples to describe the technology in the present disclosure and, hence, various modifications, replacements, additions, omissions, etc., can be made within the scopes of the claims or their equivalents.

The present disclosure can be applied to an imaging apparatus that uses fins to cool a plurality of cooling targets present.

What is claimed is:

1. An imaging apparatus comprising:
a duct through which air flows;
a fan that generates a flow of air in the duct;
a first cooling target disposed outside the duct;
a first heat sink that absorbs heat of the first cooling target and includes a plurality of first fins exposed in the duct;
a second cooling target disposed outside the duct;
a second heat sink that absorbs heat of the second cooling target and includes a plurality of second fins exposed in the duct;
a third cooling target disposed outside the duct; and
a third heat sink that absorbs heat of the third cooling target and includes a plurality of third fins exposed in the duct,
wherein the first fins, the second fins, and the third fins extend in different directions from one another, as viewed in a direction of the flow of air in the duct, and
wherein each of the plurality of first fins, the plurality of second fins and the plurality of third fins are respectively separate from each of the others of the plurality of first fins, the plurality of second fins and the plurality of third fins.

2. The imaging apparatus according to claim 1, wherein the first fins, the second fins, and the third fins are disposed at a same position in the direction of the flow.

3. The imaging apparatus according to claim 1, wherein the first fins, the second fins, and the third fins are identical in size in the direction of the flow.

4. The imaging apparatus according to claim 1, wherein fin surface areas of the first fins, second fins, and third fins are determined based on at least amounts of heat of the first cooling target, second cooling target, and third cooling target, respectively.

5. The imaging apparatus according to claim 4, wherein the fin surface areas of the first fins, second fins, and third fins are determined based on the amounts of heat and allowable temperatures of the first cooling target, second cooling target, and third cooling target, respectively.

6. The imaging apparatus according to claim 4, wherein respective extension lengths and numbers of fin of the first fins, second fins, and third fins are determined based on the fin surface areas.

7. The imaging apparatus according to claim 4, wherein a plurality of fins of a heat sink that absorbs heat of a cooling target having a largest amount of heat extend beyond half of the duct.

8. The imaging apparatus according to claim 1, wherein
a channel cross section of the duct has a rectangular shape, and
any two of the first cooling target, the second cooling target, and the third cooling target face each other across the duct.

9. The imaging apparatus according to claim 1, wherein
the first cooling target is an imaging element,
the second cooling target is an IC chip that processes an image data generated by the imaging element, and
the third cooling target is a connector into which a storage medium that the image data processed by the IC chip is recorded on is inserted.

10. An imaging apparatus comprising:
a duct through which air flows;
a fan that generates a flow of air in the duct;
a first cooling target disposed outside the duct;
a first heat sink that absorbs heat of the first cooling target and includes a plurality of first fins exposed in the duct;
a second cooling target disposed outside the duct;
a second heat sink that absorbs heat of the second cooling target and includes a plurality of second fins exposed in the duct;
a third cooling target disposed outside the duct; and
a third heat sink that absorbs heat of the third cooling target and includes a plurality of third fins exposed in the duct,
wherein each of a first space defined by a first enclosure line enclosing all first fins at minimum length, a second space defined by a second enclosure line enclosing all second fins at minimum length, and a third space defined by a third enclosure line enclosing all third fins at minimum length are respectively independent from the others, as viewed in a direction of the flow of air in the duct.

11. The imaging apparatus according to claim 10, wherein the first fins, second fins, and third fins do not overlap each other as viewed in a direction of the flow of air in the duct.

12. The imaging apparatus according to claim 10, wherein fin surface areas of the first to third fins are determined based on at least amounts of heat of the first to third cooling targets, respectively.

13. The imaging apparatus according to claim 12, wherein the fin surface areas of the first to third fins are determined based on the amounts of heat and allowable temperatures of the first to third cooling targets, respectively.

14. The imaging apparatus according to claim 12, wherein the determined the fin surface areas of the first to third fins are achieved by extension lengths and numbers of fins of the respective fins.

15. The imaging apparatus according to claim 1, wherein each of the plurality of first fins, the plurality of second fins and the plurality of third fins are respectively separate from each of the others of the plurality of first fins, the plurality of second fins and the plurality of third fins a predetermined distance.

16. The imaging apparatus according to claim 1, wherein at least one of: the plurality of first fins have different lengths, the plurality of second fins have different lengths and the plurality of third fins have different lengths.

17. The imaging apparatus according to claim 1, wherein the fan is disposed in the duct with an entire flow cross section of the duct being covered by the fan.

18. The imaging apparatus according to claim 10, wherein at least one of: the plurality of first fins have different lengths, the plurality of second fins have different lengths and the plurality of third fins have different lengths.

19. The imaging apparatus according to claim 10, wherein the fan is disposed in the duct with an entire flow cross section of the duct being covered by the fan.

\* \* \* \* \*